US012560141B2

(12) United States Patent
Trönnberg et al.

(10) Patent No.: US 12,560,141 B2
(45) Date of Patent: Feb. 24, 2026

(54) SYSTEM AND METHOD OF CONTROLLING A VEHICLE

(71) Applicant: VOLVO TRUCK CORPORATION, Gothenburg (SE)

(72) Inventors: Gabriel Trönnberg, Trollhättan (SE); Henrik Ryberg, Gothenburg (SE); Lars Karlsson, Gothenburg (SE); Markus Schellenberger, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/934,740

(22) Filed: Nov. 1, 2024

(65) Prior Publication Data

US 2025/0163877 A1 May 22, 2025

(30) Foreign Application Priority Data

Nov. 17, 2023 (EP) .................................... 23210555

(51) Int. Cl.
*F02N 11/08* (2006.01)

(52) U.S. Cl.
CPC ...... *F02N 11/0814* (2013.01); *F02N 11/0851* (2013.01); *F02N 2200/08* (2013.01)

(58) Field of Classification Search
CPC ............. F02N 11/0814; F02N 11/0851; F02N 2200/08; B60W 30/18172; B60W 2030/1809
See application file for complete search history.

(56) References Cited

U.S. PATENT DOCUMENTS 9,920,731 B2 3/2018 Lee et al.
11,491,983 B1 11/2022 Sun et al.
(Continued)

FOREIGN PATENT DOCUMENTS

CN 102390376 B 7/2014
DE 102019132533 A1 1/2021
(Continued)

OTHER PUBLICATIONS

Extended European Search Report in corresponding European Application No. 23210555.1 dated Apr. 26, 2024 (9 pages).
(Continued)

*Primary Examiner* — Syed O Hasan
(74) *Attorney, Agent, or Firm* — Jeffri A. Kaminski; Venable LLP

(57) ABSTRACT

A computer system controls an engine restart attempt of a vehicle, while the vehicle is moving. The computer system has processing circuitry to obtain data comprising real-time rotational speed level of any one of a powertrain shaft being mechanically connected to one or more wheels and the one or more wheels; control a controllable clutch to a torque transfer position, allowing the controllable clutch to change a torque transfer between an engine and the one or more wheels; determine, from the received data, a speed decrease of the rotational speed level; determine a time period of the speed decrease extension; determine that the determined speed decrease exceeds a predetermined threshold level; determine that the determined time period of the speed decrease extension is within a predetermined threshold time period; and determine to abort the restart engine attempt.

13 Claims, 4 Drawing Sheets

(56) References Cited

U.S. PATENT DOCUMENTS

| | | | | |
|---|---|---|---|---|
| 2015/0112562 | A1 | 4/2015 | Bast | |
| 2016/0297445 | A1* | 10/2016 | Bjernetun | B60W 10/02 |
| 2021/0003107 | A1 | 1/2021 | Byun et al. | |

FOREIGN PATENT DOCUMENTS

| | | | | |
|---|---|---|---|---|
| EP | 2497940 | A2 | 9/2012 | |
| EP | 3693237 | B1 | 6/2021 | |
| JP | 2004122989 | A * | 4/2004 | |
| JP | 2004308614 | A * | 11/2004 | |
| KR | 20020029111 | A * | 4/2002 | B60W 10/10 |
| KR | 101745173 | B1 | 6/2017 | |
| WO | 2022064591 | A1 | 3/2022 | |

OTHER PUBLICATIONS

Extended European Search Report in corresponding European Application No. 23210547.8 dated Apr. 26, 2024 (9 pages).

* cited by examiner

SYSTEM AND METHOD OF CONTROLLING A VEHICLE

TECHNICAL FIELD

The disclosure relates generally to the field of controlling an engine restart attempt and/or engine start of a vehicle, while the vehicle is moving, and, more specifically, to an automatically controlled engine start system for vehicles. In particular aspects, the disclosure relates to a computer system, powertrain system, vehicle and methods for controlling an engine restart attempt of a vehicle, while the vehicle is moving. The disclosure can be applied to heavy-duty vehicles, such as trucks, buses, and construction equipment, among other vehicle types. The disclosure may likewise be applied to cars and light-weight vehicles. Although the disclosure may be described with respect to a particular vehicle, the disclosure is not restricted to any particular vehicle.

BACKGROUND

Conventional internal combustion engine vehicles operate continuously when the engine is running, even when idling at traffic lights, stuck in traffic, or during extended periods of inactivity. This constant engine operation results in unnecessary fuel consumption and increased emissions, contributing to environmental pollution and increased fuel costs for vehicle owners. To address these issues, various stop and start technologies have been developed, such as engine idle stop-start systems, which shut off the engine when the vehicle is stationary and automatically restart it when the driver releases the brake or engages the accelerator.

In recent years, there has been a growing demand for more sophisticated and intelligent engine stop-and-start systems that can adapt to a wider range of driving conditions. The development of automatic and predictive engine stop-and-start systems addresses these challenges by incorporating predictive algorithms, real-time data sources, and advanced control strategies. Automatic and predictive engine stop-and-start systems aim to provide smoother, more efficient, and less intrusive engine stop-and-start experiences for drivers while increasing fuel savings and emissions reduction.

However, in connection with the use of such systems in a heavy-duty vehicle, there is still a need for further improving the engine start operation, while the vehicle is moving.

SUMMARY

According to a first aspect of the disclosure, there is provided a computer system for controlling system for controlling an engine restart attempt of a vehicle, while the vehicle is moving, the computer system comprising processing circuitry configured to: obtain data comprising real-time rotational speed level of any one of a powertrain shaft being mechanically connected to one or more wheels, and the one or more wheels; control a controllable clutch to a torque transfer position, allowing the controllable clutch to change a torque transfer between the engine and the one or more wheels; determine, from the received data, a speed decrease of the rotational speed level; determine a time period of the speed decrease extension; determine that the determined speed decrease exceeds a predetermined threshold level; determine that the determined time period of the speed decrease extension is within a predetermined threshold time period; and determine to abort the restart engine attempt.

The first aspect of the disclosure may seek to improve, or at least ensure adequate, stability of the vehicle during an operation of restarting an engine while the vehicle is moving. In particular, the disclosure may seek to improve, or at least ensure adequate, stability of the vehicle when attempting to restart the engine by using the clutch while the vehicle is moving. A technical benefit may include to provide an improved prediction of the possibility of allowing the clutch to be used for restarting the engine while the vehicle is moving. Using the clutch as a means for restarting the engine while the vehicle is moving may be favorable over other alternatives in terms of improved fuel efficiency.

More specifically, the present disclosure is based on the presumption that, during a clutch controllable engine start, a braking torque may generally be generated on the vehicle during slippery road conditions. This type of braking torque may lead to excessive wheel slip, which will have a negative impact on the stability of the vehicle. That is, excessive wheel slip may generally result in vehicle instability during a clutch controllable engine start. Hence, by determining that the time period of the speed decrease extension is within the predetermined threshold time period, the computer system is allowed to determine the risk of excessive wheel slip, and hence the risk of vehicle instability during the engine start attempt. As such, if the determined time period of the speed decrease extension is within the predetermined threshold time period, the computer system will determine to abort the ongoing clutch controllable engine restart.

The provision of controlling the controllable clutch to the torque transfer position, allowing the controllable clutch to change a torque transfer between the engine and the one or more wheels, provides for initiating the engine restart attempt.

Optionally in some examples, including in at least one preferred example, the powertrain shaft being mechanically connected to one or more wheels may be any one of an internal shaft of the transmission arrangement, an output shaft of the transmission arrangement, and a driven wheel axle. The powertrain system can be provided in several different configurations depending on type of transmission arrangement and number of rotational shafts. In one example, the powertrain shaft is the internal shaft of the transmission arrangement. In another example, the powertrain shaft is the output shaft of the transmission arrangement. In another example, the powertrain shaft is the driven axle of the wheel.

Optionally in some examples, including in at least one preferred example, the real-time rotational speed level of the powertrain shaft is obtained from a sensor configured to measure a speed parameter. A technical benefit may include to provide a more direct measure of the rotational speed level of the powertrain shaft.

Optionally in some examples, including in at least one preferred example, the real-time rotational speed level of the one or more wheels is obtained from one or more wheel sensors. A technical benefit may include to provide an even more direct measure of the rotational speed level of the wheels.

Optionally in some examples, including in at least one preferred example, the speed decrease is determined by comparing a rotational speed level of a driven wheel with a rotational speed level of a non-driven wheel. A technical benefit may include to provide an even more direct measure of the rotational speed level of the wheels. In this manner, it becomes possible to more directly determine wheel slip, and thus the speed decrease.

Optionally in some examples, including in at least one preferred example, in response to the determined abortion of the clutch controllable restart engine attempt, the processing circuitry is configured to alert a user of the vehicle about the aborted restart engine attempt. A technical benefit may include to provide an improved adaptability of the system and method in which the user, such as the drive, can act upon the aborted clutch controllable engine restart and select another engine restart option in a manual manner.

Optionally in some examples, including in at least one preferred example, in response to the determined abortion of the clutch controllable restart engine attempt, the processing circuitry is further configured to perform an additional restart engine attempt. A technical benefit may include to provide an iterative and automatic engine restart sequence.

Optionally in some examples, including in at least one preferred example, the processing circuitry is configured to determine to postpone the additional restart engine attempt a predefined time period; determine to decrease an engine speed threshold for when fuel is allowed to be injected into the engine; after expiration of the predefined time period, perform the second restart engine attempt by controlling a controllable clutch to restart the engine, while further allowing a fuel injector to inject a first fuel portion into the engine at the decreased engine speed threshold. A technical benefit may include to provide an improved clutch controllable engine restart attempt, where the clutch can be prioritized over other alternatives for starting the engine.

Optionally in some examples, including in at least one preferred example, the processing circuitry is configured to inject the first fuel portion at an engine speed corresponding to an engine speed that is used at a start with the starter motor. A technical benefit may include to provide an even more improved clutch controllable restart engine attempt.

Optionally in some examples, including in at least one preferred example, the additional restart engine attempt is performed by a starter motor. A technical benefit may include to provide an alternative for restarting the engine, which can be useful in situations where the road conditions may be too slippery for using the clutch.

Optionally in some examples, including in at least one preferred example, the processing circuitry is configured to initiate the restart engine attempt automatically by receiving a control command from an automatically controlled engine start system. A technical benefit may include to provide an even more advanced engine restart system that can be automatically controlled during operation of the vehicle.

According to a second aspect of the disclosure, there is provided a powertrain system comprising the computer system according to the first aspect, an internal combustion engine, a controllable clutch, a transmission arrangement coupled to the engine by means of the controllable clutch, and wherein the transmission arrangement further comprises an output shaft configured to be coupled to a driven wheel axle.

The disclosure according to the second aspect may seek to improve, or at least ensure adequate, stability of the vehicle during an operation of restarting an engine while the vehicle is moving. In particular, the disclosure may seek to improve, or at least ensure adequate, stability of the vehicle when attempting to restart the engine by using the clutch while the vehicle is moving. A technical benefit may include to provide an improved prediction of restarting the engine by using the clutch while the vehicle is moving.

Optionally in some examples, including in at least one preferred example, the powertrain system further comprising a starter motor. A technical benefit may include to provide an alternative way of performing the engine restart of the powertrain system.

According to a third aspect of the disclosure, there is provided a vehicle comprising the computer system of the first aspect and/or a powertrain system according to the second aspect.

Optionally in some examples, including in at least one preferred example, the vehicle is a non-electric heavy-duty vehicle. In this context, the term non-electric heavy-duty vehicle refers to a vehicle avoid of any electric storage and power system configured to provide traction power to the vehicle. Such electric storage system may be battery system in combination with an electric machine and/or fuel cell system in combination with an electric machine. In other words, a non-electric heavy-duty vehicle is a vehicle comprising the internal combustion engine as the primary, or the only, power source for the powertrain system. The use of the computer system for controlling an engine restart attempt of a non-electric heavy-duty vehicle, while the vehicle is moving, may be particularly useful where the internal combustion engine is the only available power source for the vehicle.

According to a fourth aspect of the disclosure, there is provided a computer-implemented method for controlling an engine restart attempt of a vehicle, while the vehicle is moving, wherein the method comprises: obtaining, by a processing circuitry of a computer system, data comprising real-time rotational speed level of any one of a powertrain shaft being mechanically connected to one or more wheels, and the one or more wheels; controlling, by the processing circuitry of the computer system, a controllable clutch to a torque transfer position, allowing the controllable clutch to change a torque transfer between the engine and the one or more wheels; determining, by the processing circuitry of the computer system, from the received data, a speed decrease of the rotational speed level; determining, by the processing circuitry of the computer system, a time period of the speed decrease extension; determining, by the processing circuitry of the computer system, that the determined speed decrease exceeds a predetermined threshold level; determining, by the processing circuitry of the computer system, that the determined time period of the speed decrease extension is within a predetermined threshold time period; and determining, by the processing circuitry of the computer system, to abort the restart engine attempt.

The disclosure according to the fourth aspect may seek to improve, or at least ensure adequate, stability of the vehicle during an operation of restarting an engine while the vehicle is moving. In particular, the disclosure may seek to improve, or at least ensure adequate, stability of the vehicle when attempting to restart the engine by using the clutch while the vehicle is moving. A technical benefit may include to provide an improved prediction of restarting the engine by using the clutch while the vehicle is moving. According to a fifth aspect of the disclosure, there is provided a computer program product comprising program code for performing, when executed by the processing circuitry of the first aspect, the method of the fourth aspect.

According to a sixth aspect of the disclosure, there is provided a non-transitory computer-readable storage medium comprising instructions, which when executed by the processing circuitry of the first aspect, cause the processing circuitry to perform the method of fourth aspect.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

DETAILED DESCRIPTION

Figure 1:
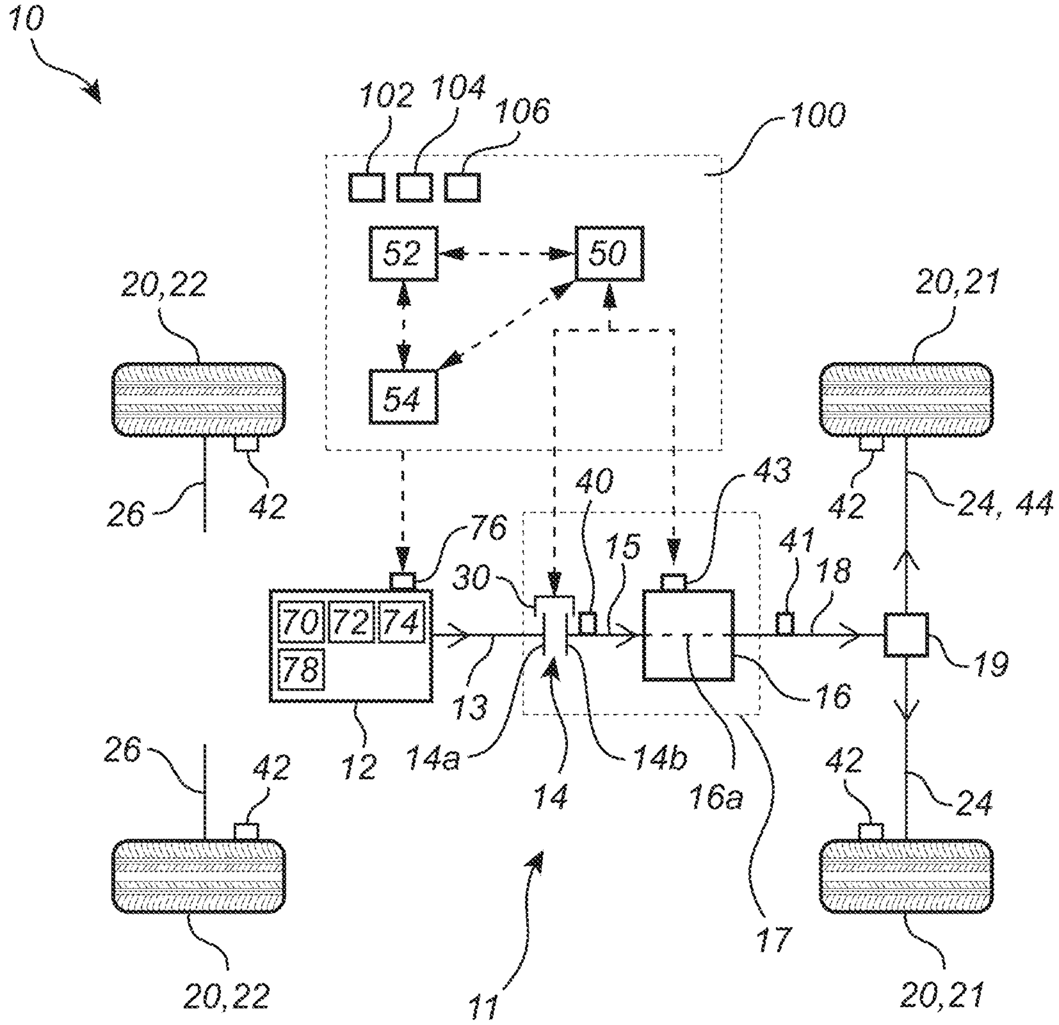
FIG. 1 illustrates an exemplary view of a vehicle comprising a powertrain system and a computer system having a processing circuitry configured to control controllable clutch according to an example.

The detailed description set forth below provides information and examples of the disclosed technology with sufficient detail to enable those skilled in the art to practice the disclosure.

The present disclosure is at least partly based on the realization that restarting an engine, while the vehicle is moving, may still be challenging in terms of providing a desirable and long-term reliable operation of the vehicle. More specifically, in the field of heavy-duty vehicles, there is increasing demand for improving the fuel efficiency and reduce emissions of the internal combustion engine. One technology designed to improve the fuel efficiency and reduce emissions is an automatically controlled engine start system. The automatically controlled engine start system is here an integral part of a so-called automatic and predictive engine stop-and-start system for vehicles. Automatic and predictive engine stop-and-start systems are configured to automatically control one or more vehicle operations, such as restarting the engine, using predictive data and real-time information.

While the use of the automatic and predictive engine stop-and-start systems in heavy-duty vehicles provides a positive impact on the operation of the vehicle, there is still a challenge to further improve the operations of restarting the engine while the vehicle is moving.

In one example, the engine can be restarted by a conventional starter motor. In other examples, the engine may be restarted by controlling the clutch in-between the engine and the transmission arrangement. In other words, automatic and predictive engine stop-and-start systems may be designed to start the engine by closing the clutch. However, using the clutch when restarting the engine while the vehicle is moving may generally create a braking torque on the wheels of the vehicle during the starting of the engine. This braking torque may lead to excessive wheel slip and hence vehicle instability, in particular for lightly laden vehicles on slippery roads.

To remedy this, the present disclosure provides a control strategy to abort an engine restart, such as an automatically controllable engine restart, i.e. to abort an engine restart attempt if it is predicted or determined that there is a risk of generating excessive wheel slip during a clutch controllable engine start.

The disclosure may seek to improve, or at least ensure adequate, stability of the vehicle during an operation of restarting an engine while the vehicle is moving. In particular, the disclosure may seek to improve, or at least ensure adequate, stability of the vehicle when attempting to restart the engine by using the clutch while the vehicle is moving. A technical benefit may include to provide an improved prediction of restarting the engine by using the clutch while the vehicle is moving.

Using the clutch to restart the engine, while the vehicle is moving may be particularly useful for heavy-duty vehicle operating in a so-called freewheeling mode. Freewheeling in the context of present disclosure refers to a mode of operation where the engine is disengaged from the transmission (or gearbox) and effectively placed in neutral or a similar state. In this mode, the engine is not providing power to the wheels, and the vehicle coasts without the assistance of the engine's power output. This is in contrast to the normal operation of a vehicle, where the engine is engaged and provides power to the wheels to propel the vehicle forward.

The purpose of freewheeling in heavy-duty vehicles is to save fuel and reduce engine load under certain driving conditions. It is commonly used when the vehicle is descending downhill or traveling on a slope. By disengaging the engine and allowing the vehicle to coast freely, the heavy-duty vehicle can take advantage of gravitational forces to maintain or increase speed while consuming minimal fuel. This can be particularly useful for improving fuel efficiency and reducing wear and tear on the braking system during downhill descents.

Freewheeling can be engaged manually by the driver or automatically by the vehicle's control system, e.g. as a part of the automatic and predictive engine stop-and-start system. When the driver and/or an automatic vehicle control system initiates freewheeling, the transmission is typically shifted to a neutral or coasting position, decoupling the engine from the drivetrain. In some cases, the engine may idle at a minimal rpm to maintain essential functions like power steering and braking.

Freewheeling may also include a specific mode of operation where the engine is shutdown (in addition to being disengaged from the transmission). This mode of operation may be denoted as a freewheeling mode with the engine shutdown. When restarting the engine after a freewheeling period, in which the engine has been shutdown, it may be beneficial to use the clutch to spin up the engine speed instead of using a starter motor. The reason behind using the clutch to restart the engine is that the lifetime of the starter motor may be more limiting than the lifetime of the clutch system. Another reason is that starting the engine with the clutch instead of a starter motor may generally be more fuel efficient and has less energy losses overall, due to the fact that the energy used for the starter motor actuation goes through the alternator.

Moreover, the starter motor may also be dependent on the state of charge of the battery system. As the battery system may also power other functions within the vehicle, there is a risk of a partial blackout during an engine start attempt with the starter motor if the system voltage is on a low level.

However, using the clutch for starting the engine during slippery road conditions while the vehicle is moving may generally generate a braking torque on the wheels of the vehicle. This braking torque may lead to excessive wheel slip and hence vehicle instability, in particular for lightly laden vehicles on slippery roads. Such excessive wheel slip may often result in a loss of traction, also known as "skidding", causing the tires to slide, or spinning without providing effective control or grip.

To this end, the present disclosure proposes to predict or detect excessive wheel slip, e.g. due to slippery road condition, by determining a speed decrease of a rotational speed level; determining a time period of the speed decrease extension; determine that the determined speed decrease exceeds a predetermined threshold level; and determine that the determined time period of the speed decrease extension is within a predetermined threshold time period. As a result of this comparison, a processing circuitry of the computer system may determine to abort an ongoing restart engine attempt by the clutch. One example of a vehicle comprising such computer system will now be described in relation to a vehicle in the form of a heavy-duty vehicle.

FIG. 1 schematically illustrates an exemplary vehicle 10. The vehicle 10 in FIG. 1 comprises a powertrain system 11. The powertrain system 11 is adapted to power the vehicle 10.

In addition, as depicted in FIG. 1, the vehicle 10 comprises a computer system 100. In this example, the powertrain system 11 comprises the computer system 100. In other examples, the computer system 100 is a separate part of the vehicle, which is configured to be in communication with the powertrain system 11. The computer system 100 may also be a remote server configured to be in communication with the powertrain system 11.

The computer system 100 is configured to control the powertrain system 11. In addition, the computer system 100 is intended to control an engine restart attempt of the vehicle 10, while the vehicle 10 is moving. The computer system 100 is thus configured to control restart attempts as well as restart of the engine 12 of the vehicle 10, while the vehicle 10 is moving.

The computer system 100 here comprises a processing circuitry 102. The operations of the processing circuitry 102 will be further described herein.

In FIG. 1, the computer system 100 also comprises a memory 104 and a system bus 106. These components and further optional technical details of the computer system 100 are described in relation to FIG. 4.

Turning again to FIG. 1, the powertrain system 11 comprises an internal combustion engine 12. For ease of reference, the internal combustion engine will be denoted as the engine. The engine 12 comprises at least one cylinder 74 having a combustion chamber 70 and a reciprocating piston 72. More specifically, the engine 12 comprises a plurality of cylinders 74, each one having a corresponding combustion chamber 70 and a corresponding piston 72 arranged therein.

The powertrain system 11 also comprises a fuel injector 78, as illustrated in FIG. 1. The fuel injector 78 is here an integral part of the engine 12. The fuel injector 78 is configured to inject fuel into the engine 12. The fuel injector 78 may be any suitable type of injector capable of injecting fuel such as a diesel fuel, a gaseous fuel and the like. In general, the fuel injector 78 is arranged in the cylinder 74, and axially above the piston 72. Each one of the cylinders 74 of the engine 12 comprises a corresponding fuel injector 78. The fuel injector 78 is controllable by the computer system 100. By way of example, the fuel injector 78 is controllable by the processing circuitry 102 of the computer system 100.

The engine 12 is configured to output a rotational speed via an engine output shaft 13, as illustrated in e.g. FIG. 1. Hence, the powertrain system 11 comprises the engine output shaft 13.

The engine 12 is generally configured to operate in a conventional four stroke fashion, i.e. operated by an intake stroke, a compression stroke, a combustion stroke, and an exhaust stroke. In this example, the engine is an internal diesel combustion engine, i.e. an engine designed to work according to the diesel process. By way of example, the engine 12 is a compression ignition internal combustion engine. The engine 12 may also be provided in other types of configurations or be operated by other types of fuels. The components of an engine are well-known, and thus not further described herein.

The powertrain system 11 here also comprises a starter motor 76. The starter motor 76 is here an integral part of the engine 12. Alternatively, the starter motor 76 is operatively connected to the engine 11 to allow the starter motor 76 to crank the engine 12, as is commonly known in the art. As such, the starter motor 76 is configured to crank the engine 12. Engine cranking is performed by controlling the starter motor 76 to engage a flywheel so as to initiate combustion.

Moreover, the powertrain system 11 comprises a transmission arrangement 17. The transmission arrangement 17 comprises a gearbox 16 and a controllable clutch 14.

The gearbox 16 has a number of gear stages to obtain a set of gears. Each one of the gears has a corresponding gear ratio. The transmission arrangement 17 may sometimes be denoted simply as the transmission.

The transmission arrangement 17 is operatively connected to the engine 12 via a transmission input shaft 15. The transmission input shaft 15 is here an internal shaft of the transmission arrangement 17. The internal shaft (input shaft) 15 is coupled to the clutch 14. Therefore, the transmission arrangement 17 comprises the transmission input shaft 15. The transmission input shaft 15 rotates with a certain rotational speed while the vehicle 10 is moving. Hence, the transmission input shaft 15 has a corresponding rotational speed. The transmission input shaft 15 is one example of a powertrain shaft. The transmission arrangement 17 also has a transmission output shaft 18 for providing a rotational speed to one or more drive wheels 20 of the vehicle 10, as schematically illustrated in FIG. 1. Briefly stated, the engine output shaft 13 transmits rotational speed from the engine 12 to the transmission arrangement 17 which further transmits the motion via the transmission output shaft 18 to the drive wheels 20, which in FIG. 1 is a pair of rear wheels 21.

The transmission output shaft 18 rotates with a certain rotational speed while the vehicle is moving. Hence, the transmission output shaft 18 has a corresponding rotational speed. The transmission output shaft 18 is another example of a powertrain shaft.

As illustrated in FIG. 1, the vehicle 10 here comprises a pair of front wheels 22 and the pair of rear wheel 21. Moreover, the rear wheels 21 are here driven wheels, while the front wheels 22 are non-driven wheels. The driven wheels 21 are operatively connected to corresponding rotational driven axles 24. The non-driven wheels 22 are operatively connected to corresponding rotational non-driven axles 26. In general, the vehicle 10 comprises one or more driven wheels and one or more non-driven wheels. The driven wheels 21 are driven by the powertrain system 11.

As such, the pair of front wheels 22 are here operatively connected to the respective non-driven axles 26. In a similar vein, the pair of rear wheels 21 are here operatively connected to the respective driven axles 24.

The transmission arrangement 17 is one of a semi-automatic transmission arrangement and an automatic transmission arrangement. Automatic transmission arrangements are common in heavy-duty vehicles to control engagement and disengagement of e.g. an automated disk-clutch between the engine and the transmission arrangement. An automatic transmission arrangement is typically made up of the internal (input) shaft 15, an intermediate shaft 16*a*, which has at least one gearwheel in engagement with a gearwheel on the input shaft 15, and optionally an internal main shaft (not shown) with gearwheels which engage with gearwheels on the intermediate shaft 16*a*. The internal main shaft is also connected to the transmission output shaft 18 coupled to the driving wheels 21 via, for example, the drive shaft(s) 24.

The drive shaft 24 rotates with a certain rotational speed while the vehicle 10 is moving. Hence, the drive shaft 24 has a corresponding rotational speed. The drive shaft 24 is another example of a powertrain shaft.

As depicted in FIG. 1, the intermediate shaft 16*a* is generally an intermediate shaft of the gearbox 16. The intermediate shaft may in some examples correspond to the internal shaft 15 (input shaft) of the transmission arrangement 17. In one example, when the transmission arrangement 17 comprises the intermediate shaft 16*a* arranged in the transmission arrangement 17, the intermediate shaft 16*a* rotates with a certain rotational speed while the vehicle is moving. Hence, the intermediate shaft 16*a* has a corresponding rotational speed. The intermediate shaft 16*a* is another example of a powertrain shaft.

The transmission arrangement 17 is in this example an automated manual transmission (AMT), configured to transmit torque to the drive wheels 21. Typically, the transmission arrangement 17 is configured to transmit torque to the drive wheels 21 via the transmission output shaft 18 via one or more driven wheel shafts 24 or the like. In other words, the vehicle 10 is typically provided with an engine 12 operatively connected to the transmission arrangement 17, such as an automated manual transmission (AMT), for transmitting torque to the vehicle driven wheels 21.

As mentioned above, and as also illustrated in FIG. 1, the powertrain system 11 also comprises the clutch 14. The clutch 14 is here a controllable clutch. The controllable clutch 14 is e.g. controllable by a processing circuitry 102 of a computer system 100, as will be further described herein. Hence, the term controllable clutch refers to a clutch that is configured to be controllable by a processing circuitry, such as the processing circuitry 102. For ease of reference, the controllable clutch may simply be referred to as the clutch 14. The clutch 14 can be arranged in several manners in the powertrain system 11. In FIG. 1, the controllable clutch 14 is arranged in-between the engine 12 and the transmission arrangement 17. The controllable clutch 14 is configured to operatively connect the transmission arrangement 17 with the engine 12. In particular, the controllable clutch 14 is configured to operatively connect the engine output shaft 13 of the engine 12 to the transmission input shaft 15 of the transmission arrangement 17. As such, the engine output shaft 13 of the engine 12 can be operatively connected to the transmission input shaft 15 of the transmission arrangement 17 via the controllable clutch 14 when a gear is engaged. As is commonly known in the art, the transmission arrangement 17 and the clutch 14 are hereby operable to select a gear ratio between the engine 12 and a pair of the driven wheels 21.

While FIG. 1 schematically illustrates an example where the transmission arrangement 17 includes the controllable clutch 14, the controllable clutch 14 can also be a stand-alone device of the powertrain system 11.

The controllable clutch 14 may comprise various components, including a pressure plate 14*b* and a clutch plate 14*a* (also known as a friction disc) positioned between the engine's flywheel (not illustrated) and the transmission's input shaft 15. When the clutch 14 is engaged, the clutch plate 14*a* is pressed against the flywheel, enabling power transfer. The pressure plate 14*b* is responsible for applying force to the clutch plate 14*a* to keep it engaged with the flywheel. The controllable clutch 14 may generally also comprise bearings, such as thrust bearings, and a clutch fork. These components are well-known components of the clutch.

The controllable clutch 14 further comprises a clutch actuator 30. The clutch actuator 30 is configured to control the controllable clutch 14. By way of example, the clutch actuator 30 is e.g. configured to control (move) the pressure plate 14*a*, as is commonly known in the art.

To sum up, the controllable clutch 14 is a mechanical component configured to transfers power from the engine 12 into the transmission arrangement 17. Moreover, the controllable clutch 14 is configured to disconnect the engine 12 from the gearbox 16 and the rest of the transmission arrangement 17, when required. The controllable clutch 14 is thus configured for transmitting the rotational torque from the engine 12 to the driven wheels 21. By way of example, the controllable clutch 14 is one of a single clutch unit, a dual-clutch unit, or any other type of multi-clutch unit.

The controllable clutch 14 is controlled by the computer system 100. In particular, the controllable clutch 14 is controlled by the processing circuitry 102 of the computer system 100. By way of example, the controllable clutch 14 is controlled by the processing circuitry 102 of the computer system 100 via the clutch actuator 30, as illustrated in FIG. 1.

The controllable clutch 14 allows the computer system 100 to engage or disengage the engine's power from the wheels 20. The controllable clutch 14 is thus configured to engage the engine 12 to the gearbox 16 as well as to disengage the engine 12 from the gearbox 16. The controllable clutch 14 can also be used to allow smooth starts through clutch control, which partially engages allowing the clutch to slip. In this example, the controllable clutch 14 is also controlled to restart the engine 12 while the vehicle 10 is moving. As such, the controllable clutch 14 is used for restarting the engine 12.

Optionally, the vehicle 10 also includes a differential function 19 arranged in-between the pair of driven wheels 21 and the transmission arrangement 17. The differential function 19 operatively connects the output shaft 18 of the transmission arrangement 17 with the driven axles 24. The differential function 19 is a well-known standard component and thus not further described herein.

The vehicle 10 may optionally include a service brake unit (not shown). The service brake unit may be a wet brake type or a dry brake type. The service brake unit is typically configured for performing a brake function. As an example, the service brake unit is a wheel brake. In addition, a service brake unit may be provided for each wheel.

The powertrain system 11 here also comprises one or more sensors configured to measure a speed parameter. The vehicle 10 comprises one or more sensors configured to measure a speed parameter. In FIG. 1, the powertrain system 11 comprises a speed sensor 40 configured to determine a rotational speed of the input shaft 15 of the transmission 17. As such, the speed sensor 40 is arranged and configured to monitor a speed parameter, such as the rotational speed level of the input shaft 15. The monitored rotational speed level of the input shaft 15 is transferred to the processing circuitry 102. Accordingly, the processing circuitry 102 is configured to obtain real-time rotational speed level of the input shaft 15 from the sensor 40.

In addition, or alternatively, in FIG. 1, the powertrain system 11 comprises a speed sensor 41 configured to determine a rotational speed of the output shaft 18 of the transmission 17. As such, the speed sensor 41 is arranged and configured to monitor a speed parameter, such as the rotational speed level of the output shaft 18. The monitored rotational speed level of the output shaft 18 is transferred to the processing circuitry 102. Accordingly, the processing circuitry 102 is configured to obtain real-time rotational speed level of the output shaft 18 from the sensor 41.

In addition, or alternatively, in FIG. 1, the powertrain system 11 comprises a speed sensor 43 configured to determine a rotational speed of the intermediate shaft 16*a* of the transmission 17. As such, the speed sensor 43 is arranged and configured to monitor a speed parameter, such as the rotational speed level of the intermediate shaft 16*a*. The monitored rotational speed level of the intermediate shaft 16*a* is transferred to the processing circuitry 102. Accordingly, the processing circuitry 102 is configured to obtain real-time rotational speed level of the intermediate shaft 16*a* from the sensor 43.

In addition, or alternatively, in FIG. 1, the powertrain system 11 comprises a speed sensor 44 configured to determine a rotational speed of at least one of the driven axles 24. As such, a corresponding speed sensor is arranged and configured to monitor a speed parameter, such as the rotational speed level of the driven axle 24. The monitored rotational speed level of the driven axle 24 is transferred to the processing circuitry 102. Accordingly, the processing circuitry 102 is configured to obtain real-time rotational speed level of the driven axle 24 from a corresponding speed sensor.

In addition, or alternatively, the vehicle 10 comprises a wheel sensor 42 configured to determine a speed level of at least one wheel, such as one of the driven wheels 21. The monitored rotational speed level of the wheel 21 is transferred to the processing circuitry 102. Accordingly, the processing circuitry 102 is configured to obtain real-time rotational speed level of the wheel 21 from a corresponding wheel sensor 42.

In addition, or alternatively, the vehicle 10 comprises a set of wheel sensors 42 configured to determine a speed level of both the driven wheels 21 and the non-driven wheels 22. In this manner, it becomes possible to determine a speed level difference between the driven wheels 21 and the non-driven wheels 22. The monitored speed level difference between the driven wheels 21 and the non-driven wheels 22 is transferred to the processing circuitry 102. Accordingly, the processing circuitry 102 is configured to obtain real-time rotational speed level difference between the wheels 21 and 22 from the set of wheel sensors 42.

The processing circuitry 102 is configured to determine a speed decrease by comparing a rotational speed level of the driven wheel 21 with a rotational speed level of the non-driven wheel 22.

It should be readily appreciated that the wheel sensor(s) 42 may likewise be an integral part of the powertrain system 11.

Each one of the sensors 40, 41, 42 and 43 are configured to be in communication with the processing circuitry 102 of the computer system 100. In this manners, each one of the sensors 40, 41, 42 and 43 are configured to measure a rotational speed level of the respective shaft and/or wheel, and transfer the rotational speed level to the processing circuitry 102. As such, the processing circuitry 102 is configured to obtain real-time data about the rotational speed level of the corresponding shaft and/or wheel.

Turning again to the transmission arrangement 17. The transmission arrangement 17 may be configured to be controlled by the driver and/or automatically via an electronic control unit (ECU). One example of an ECU is a transmission control unit. In FIG. 1, the powertrain system 11 comprises the transmission control unit (TCU) 50. The transmission control unit may also be denoted as a transmission electronic control unit (TECU). By way of example, the TCU 50 is an integral part of the computer system 100. The TCU 50 is configured to control the transmission arrangement 17. Hence, the TCU 50 is configured to control the controllable clutch 14 and the gearbox 16.

The computer system 100 may also comprise an automatically controlled engine start system 54. The automatically controlled engine start system 54 is configured to automatically control the operation of restarting the engine 12 while the vehicle 10 is moving. The automatically controlled engine start system 54 is here an integral part of an automatic and predictive engine stop-and-start system. Such system is configured to predict suitable situations where the engine can be shutdown and restarted, while the vehicle 10 is moving, and also configured to control the shutdown and restart of the engine 12, while the vehicle 10 is moving. The automatically controlled engine start system 54 may include a predictive cruise control system, or at least be configured to communicate with a predictive cruise control system of the vehicle 10. Hence, the computer system 100 may also comprise the predictive cruise control system. The predictive cruise control system is configured to control the powertrain system 11 based on predicted changes in relation to the route ahead of the vehicle 10. A predictive cruise control system may generally be configured to control the vehicle 10 based on topographical and route data. The predictive cruise control system may comprise, or communicate with, a radar or lidar sensors used to detect vehicles and obstacles ahead, camera system to provide visual data about the road and traffic conditions, GPS (Global Positioning System) to determine the vehicle position. The predictive cruise control system may further be configured to provide, or acquire, information about the road ahead, including changes in terrain, curves, and upcoming traffic conditions, speed and distance settings, brake control data, throttle control to maintain desired speed or accelerate, etc.

As depicted in FIG. 1, the TCU 50 is also configured to be in communication with the automatically controlled engine start system 54. As such, the TCU 50 can control the controllable clutch 14 in response to data from the automatically controlled engine start system 54. In addition, the TCU 50 is here configured to be in communication with an electronic brake system (EBS) 52. The processing circuitry 102 can either be an integral part of the TCU, or a separate part configured to be in communication with the TCU 50.

In other examples, the TCU 50 comprises the automatically controlled engine start system 54.

The TCU 50 is here also configured to be in communication with an electronic control unit of the engine 12. Such electronic control unit may be denoted as an engine electronic control unit (EECU) or an engine management system (EMS).

In the following, an exemplary set of operations for performing an engine restart attempt will be further described. The engine restart attempt is performed and controlled by the computer system 100. The computer system 100 is intended to control the engine restart attempt of the vehicle 10, while the vehicle 10 is moving. A moving vehicle is contrary to a stand-still vehicle, which is in a stationary vehicle state. A moving vehicle is in a non-stationary state. Accordingly, the computer system 100 is configured to control the engine restart attempt of the vehicle 10, while the vehicle 10 is moving. The following operations may generally be performed by the processing circuitry 102 of the computer system 100 so as to control the engine restart attempt of the vehicle 10, while the vehicle 10 is moving.

The processing circuitry 102 obtains data comprising real-time rotational speed level of at least one of the powertrain shafts, e.g. the output shaft 18 of the transmission arrangement 17. As the output shaft 18 is mechanically connected to the wheels 21, it becomes possible to monitor the wheel rotational speed, and thus indirectly any changes in the rotational speed level due to slipper road conditions. As mentioned above, the processing circuitry 102 can be configured to obtain data comprising real-time rotational speed level of any one of the powertrain shafts being mechanically connected to the wheels 20, 21. The rotational speed level is obtained from one or more of the speed sensors 40, 41, 43, as mentioned above. Moreover, monitoring the rotational speed level of the powertrain shaft allows for determining a decrease in the rotational speed level of the powertrain shaft. As a decrease in the rotational speed level of the powertrain shaft is an indication of the decrease in rotational wheel speed, the decrease in the rotational speed level of the powertrain shaft is an indirect measurement of wheel slip. As mentioned above, a detected wheel slip is here a measure for slippery road condition.

It should also be readily appreciated that in some examples, the processing circuitry 102 obtains data comprising real-time rotational speed level of several different powertrain shafts, such as the internal shaft 15 of the transmission arrangement 17, the output shaft 18 of the transmission arrangement 17, and one or more driven axles 24. Each one of these powertrain shafts are configured to be mechanically connected to one or more wheels. Accordingly, term "powertrain shaft" as used herein may refer to any one of the internal shaft 15 of the transmission arrangement 17, the output shaft 18 of the transmission arrangement 17, and the driven axle 24.

In other examples, the processing circuitry 102 obtains data comprising a real-time rotational speed level of the wheels 20, 21, 22. The rotational speed level of the wheels 20, 21, 22 is obtained e.g. from the wheel sensors 42, as mentioned above.

It may also be possible that the processing circuitry 102, in one example, obtains data comprising real-time rotational speed level of one or more powertrain shafts, such as the internal shaft 15 of the transmission arrangement 17, the output shaft 18 of the transmission arrangement 17, and one or more driven axles 24, and also data comprising a real-time rotational speed level of the wheels 20, 21, 22. In this case, the processing circuitry may perform a comparison between the data to either use one of them as input data for the following operations of the processing circuitry 102, or combine the data to define an average rotational speed level.

The processing circuitry 102 further controls the controllable clutch 14 to a torque transfer position. In the torque transfer position, the controllable clutch 14 is set in a state in which torque is transferable between the engine 12 and the wheels 20, more specifically the driven wheels 21 (here also corresponding to the rear wheels). Hence, by the controlling controllable clutch 14 to the torque transfer position, the controllable clutch 14 is allowed to change a torque transfer between the engine 12 and the wheels 21. In this manner, the computer system 100 is configured to initiate the engine restart attempt. The controllable clutch 14 can be controlled in several different manners. By way of example, the controllable clutch 14 is controlled to gradually change the torque transfer between the engine 12 and the wheels 21. Alternatively, or in addition, the controllable clutch 14 can be controlled to change the torque transfer between the engine 12 and the wheels 21 in step-wise manner. Hence, the clutch 14 can either be set in a partly engaged state or in a fully engaged state so as to initiate the engine restart attempt.

Moreover, the processing circuitry 102 determines, from the received data, a speed decrease of the rotational speed level.

The speed decrease is here determined by continuously monitoring the rotational speed level, and subsequently determine a change in the rotational speed. Hence, the processing circuitry 102 is configured to compare a rotational speed level measured at a first point in time with a rotational speed level measured at a second point in time. If the outcome of the comparison indicates a decrease in rotational speed, the processing circuitry 102 concludes that there is a speed decrease of the rotational speed.

In addition, or alternatively, the speed decrease can be determined by comparing a rotational speed level of a driven wheel 21 with a rotational speed level of a non-driven wheel 22. This type of speed decrease can be determined by the processing circuitry 102 or transferred to the processing circuitry 102 from the EBS 72. Determining speed decrease by comparing a rotational speed level of a driven wheel 21 with a rotational speed level of a non-driven wheel may contribute to improving the accuracy in determining the wheel slip. The driven wheel 21 may be the rear wheel. The non-driven wheel 22 may be the front wheel.

To sum up, the speed decrease of the rotational speed level, can be determined by measuring (determining) the rotational speed level from any one of the powertrain shafts, and then comparing the determined rotational speed level with a reference value or a derivative of the rotational speed level (over a certain time), and/or by measuring the rotational speed level of the driven wheel, such as the rear wheels, and then comparing the determined rotational speed level with a reference value or a derivative of the rotational speed level (over a certain time), and/or by determining the difference in rotational speed between the driven wheels and the non-driven wheels. In the latter option, the speed decrease is possible to determine in a more direct manner as the rotational speed level of the driven wheel is compared with the rotational speed level of the non-driven wheel.

Also, the processing circuitry 102 determines a time period of the speed decrease extension. The time period may be determined by a conventional timer or the like. The time period of the speed decrease extension can also be determined by the processing circuitry 102 from the obtained real-time data.

In addition, the processing circuitry 102 determines that the determined speed decrease exceeds a predetermined threshold level. As such, the processing circuitry 102 compares the determined speed decrease with a comparative speed parameter so as to determine if the detected speed decrease amounts to a potential ongoing wheel slip. The predetermined threshold can be set in several different manners by the processing circuitry 102. By way of example, the threshold level is defined as any one of a non-allowable decrease from an initial rotational speed level measure at a previous point in time, a non-allowable speed difference in comparison with a rotational speed level of a non-driven wheel, and a non-allowable speed decrease derivative.

Furthermore, the processing circuitry 102 determines that the determined time period of the speed decrease extension is within a predetermined threshold time period. By way of example, the processing circuitry 102 has access to the predetermined threshold time period. By way of example, the predetermined threshold time period is stored in the memory 104.

The above operations (steps) of determining the speed decrease of the rotational speed level, determine the time period of the speed decrease extension, determine that the determined speed decrease exceeds the predetermined threshold level, and determine that the determined time period of the speed decrease extension is within a predetermined threshold time period, provide for determining whether or not there is a risk of having detrimental braking torque on the wheels during the starting of the engine 12. These steps are thus provided so as to determine that the road condition is too slippery.

In other words, when engaging the controllable clutch 14 while the vehicle 10 is moving, a braking torque can occur due to excessive wheel slip in the braking direction of the driven wheels 21 of the driven axle 24. Such excessive wheel slip may e.g. be generated on a slippery road surface i.e. in situations when the driven wheels 21 (the ones connected to the engine) lose traction with the road surface. This situation between the wheels and the road surface can happen for several reasons, and the effects of wheel slip can vary depending on the circumstances. In general, more slippery road conditions/lower coefficient of road surface friction and less vertical load on the tires would increase the tire slip for a given brake torque applied.

Wheel slip may generally result in a loss of traction, which can have a negative impact on the stability of the vehicle 10. By way of example, when the controllable clutch 14 is set into its engaged state so that there is a mechanical connection between the engine 12 and the wheels 21, the tires are supposed to grip the road surface and transfer force from the wheels 20 to the engine 12 so as to assist in rotating the engine 12 for the purpose of restarting the engine 12 (while injecting fuel into the combustion cylinder of the engine).

However, if the road surface is too slippery (e.g., due to ice, snow, oil, water, or loose gravel), the tires may not be able to maintain a strong grip. In this situation, there would be no transfer of force from the wheels 21 of the driven axle 24 to the engine 12. Rather, the excessive wheel slip can lead to reduced control and stability, which can be particularly hazardous when the vehicle 10 is driving along a down-hill road. Such situation can also increase the risk of the vehicle 10 skidding or becoming difficult to steer.

By the above operations of the processing circuitry 102, the computer system 100 is configured to detect a deceleration, i.e. determine the decrease in rotational speed, of any of the powertrain shafts 15, 18, 24 and/or the driven wheels 21 and compare the determined declaration (decrease in rotational speed) with a reference value in the form of the predetermined threshold value. The predetermined threshold value provides a control reference for the computer system 100 to detect if the driven wheels are beginning to lock. More specifically, the predetermined threshold value is an indication of a critical rotational speed level decrease for ensuring a stable clutch controllable engine restart. Further, if the determined speed decrease continues over a given time period, i.e. the time period of the speed decrease extension exceeds a defined time period, the computer system 100 determines that the driven wheels are subjected to a braking torque, and further determine to abort the clutch controllable engine restart attempt in order to reduce the brake torque. It can also be noted that in the given situation, the braking torque on the wheels may generally originate from the clutch, as the tires have rather non-linear behavior and may quickly start to decelerate once ~10% brake slip has been built up, if the applied torque remains constant. However, if it is slippery road conditions, less torque may generally be needed before the tires start losing tractions, which will result in that the wheels slide on the road surface.

Based on the above, the processing circuitry 102 determines to abort the restart engine attempt. As such, if during a clutch controllable engine restart attempt, the transmission output shaft speed (or any other powertrain shaft or wheel speed) decreases with a sufficient amount in a short enough period of time, e.g. "X % speed decrease during Y ms", the computer system 100 determines that the above situation is an approximation of an actual longitudinal brake slip on the wheels and hence an indication that the wheels are locking up, and the ongoing clutch controllable engine restart attempt will be aborted.

That is, if the determined time period of the speed decrease extension is within the predetermined threshold time period, the processing circuitry 102 determines to abort the restart engine attempt. In other words, if the determined time period of the speed decrease extension is within the predetermined threshold time period, it is predicted that the clutch controllable engine restart attempt will likely not be successful due to the level of braking torque generated on the wheels 21 during the engine starting phase, i.e. during the process of transferring torque from the wheels 21 to the engine 12 so as to restart the engine 12. During the engine starting attempt phase, the controllable clutch 14 is in the torque transfer position, as mentioned above.

In some examples, the processing circuitry 102 may also attempt to decrease an engine speed threshold for when fuel is allowed to be injected into the engine 12 and control the fuel injector 78 to inject fuel into the engine 12 at the decreased engine speed threshold, while controlling the controllable clutch 14, as mentioned above.

In response to the determined abortion of the clutch controllable restart engine attempt, the processing circuitry 102 may optionally determine to alert a user of the vehicle 10 about the aborted restart engine attempt.

Moreover, in response to the determined abortion of the clutch controllable restart engine attempt, the processing circuitry 102 is optionally also configured to perform an additional restart engine attempt. Likely, the vehicle 10 is controlled to move further along the route to a location with better grip before initiating the additional restart engine attempt. In other examples, the processing circuitry 102 may decide to initiate the additional restart engine attempt directly. However, it may be suitable to wait at least a few seconds, e.g. 5 seconds, before initiating the additional restart engine attempt.

The additional restart engine attempt can be performed in several different ways depending on the powertrains system 11 and the vehicle 10.

In one example, the processing circuitry 102 determines to postpone the additional restart engine attempt a predefined time period. The predetermined time period is e.g. a few seconds, as mentioned above. In one example, the predefined time period is 5 seconds. However, the predefined time period may vary depending on powertrain system 11 and vehicle 10. The predefined time period is indicative of a suitable time period for allowing the vehicle 10 to move to another location along the route. The predefined time period may either be stored in the memory, as mentioned herein, and communicated to the processing circuitry 102, or determined by the processing circuitry 102 during operation of the vehicle 10.

Further, the processing circuitry 102 determines to decrease an engine speed threshold for when fuel is allowed to be injected into the engine 12.

After expiration of the predefined time period, the processing circuitry 102 performs the additional restart engine attempt by controlling a controllable clutch 14 to restart the engine 12, while further allowing a fuel injector 78 to inject a first fuel portion into the engine 12 at the decreased engine speed threshold.

Controlling the fuel injector 78 in this context generally refers to control the fuel injector 78 to inject a first fuel portion into the combustion chamber 70 of the cylinder 74 of the engine 12. The injection of fuel into the engine 12 is generally performed in parallel to the closure of the clutch 14, but may as well be performed with a slight time gap. It should be readily appreciated that the engine 12 rotates during injection of fuel.

In this example, the processing circuitry 102 thus also controls the controllable clutch 14 to restart the engine 12. The controllable clutch 14 is again controlled by the processing circuitry 102 to its torque transfer position, allowing the controllable clutch 14 to change a torque transfer between the engine 12 and the wheels, such as the rear driven wheels 21.

By way of example, the processing circuitry 102 injects the first fuel portion at an engine speed (in engine rpm) corresponding to an engine speed that is used at a start with the starter motor. The engine rpm may vary for different powertrain systems and may generally be a stored parameter in the computer system 100. Hence, by way of example, the predetermined required level of engine rpm is between about 200 rpm to 400 rpm, preferably between about 250 rpm to 350 rpm, still preferably about 300 rpm.

In other examples, the processing circuitry 102 is configured to perform the restart engine attempt by means of the starter motor 76. Hence, in one example, the additional restart engine attempt is performed by the starter motor 76. By way of example, the processing circuitry 102 is configured to control the starter motor 76 to engage the flywheel of the powertrain system 11 so as to initiate combustion, as is commonly referred to as an engine cranking operation.

By way of examples, the processing circuitry 102 may initiate any one of the restart engine attempts automatically by receiving a control command from the automatically controlled engine start system 54.

Thus, it may also be possible that the processing circuitry 102 is configured to include additional parameters and data in the operations of initiating restart of the engine while the vehicle 10 is moving. By way of example, the processing circuitry 102 may be configured to decide on the need for a restart engine attempt in response to a determined change in road condition. The change in road condition is a change in a friction coefficient between at least one of the tires of the vehicle 10 and the road.

As mentioned herein, the computer system 100 may be an integral part of the powertrain system 11, wherein the powertrain system 11 comprises at least the engine 12, the controllable clutch 14, the transmission arrangement 17 coupled to the engine 12 by means of the controllable clutch 14, and wherein the transmission arrangement 17 further comprises the output shaft 18 configured to be coupled to the driven axle 24 of a set of wheels 20, 21. Optionally, the powertrain system 11 here also comprises the starter motor 76.

The automatically controlled engine start system 54 is configured to control engine start of the vehicle 10, including the above restart engine attempts, from received topology data of an intended route for the vehicle 10, while the vehicle 10 is moving. The automatically controlled engine start system 54 is configured control the vehicle 10 from topology data by analyzing and extracting relevant information about the route, including distance, elevation changes, road conditions, and other factors that can affect the vehicle's performance and fuel consumption. The processing circuitry 102 is generally configured to obtain topology data from various sources, such as digital maps, GPS data, or geographic information system (GIS) databases. These sources may generally include relevant information about the road network, including roads, highways, elevation data, and potential destinations. In one example, the topology data is received by the processing circuitry 102 from a route planner system in the vehicle. By way of example, the processing circuitry 102 is configured to estimate one or more speed profiles for the vehicle 10.

The automatically controlled engine start system 54 may also be configured to automatically control start of the engine 12 of the vehicle 10, such as the above restart engine attempts, from various vehicle data that can be gathered from various vehicle sensors, from a navigation system of the vehicle 10, from data received from one or more control units of the vehicle 10, and/or from various technologies and systems for tracking and monitoring the vehicle 10. Thus, the processing circuitry 102 is configured to receive data and store data in the memory 104 of the computer system 100.

Figure 2:
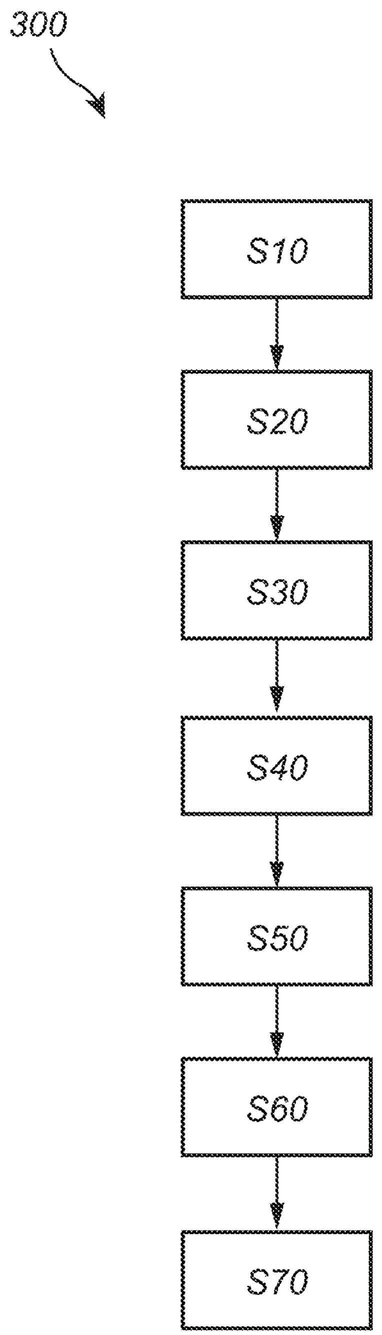
FIG. 2 is a flow chart of an exemplary method to control an engine restart attempt of a vehicle according to an example.

FIG. 2 is a flow chart of a method according to an example. More specifically FIG. 2 is an exemplary computer implemented method 300 according to an example. The computer-implemented method 300 is intended for controlling an engine restart attempt of the vehicle 10 in FIG. 1, while the vehicle 10 is moving. The method is generally implemented by the processing circuitry 102.

As illustrated in FIG. 2, the computer-implemented method 300 comprises a step of obtaining S10, by the processing circuitry 102 of the computer system 100, data comprising real-time rotational speed level of any one of a powertrain shaft being mechanically connected to one or more wheels wheel, and the wheels. The processing circuitry 102 is configured to implement this step.

Further, the computer-implemented method 300 comprises a step of controlling S20, by the processing circuitry 102 of the computer system, a controllable clutch to a torque transfer position, allowing the controllable clutch to change a torque transfer between the engine 12 and the wheels 21. The processing circuitry 102 is configured to implement this step.

Next, the computer-implemented method 300 comprises a step of determining S30, by the processing circuitry 102 of the computer system, from the received data, a speed decrease of the rotational speed level. The processing circuitry 102 is configured to implement this step.

Moreover, the computer-implemented method 300 comprises a step of determining S40, by the processing circuitry 102 of the computer system, a time period of the speed decrease extension. The processing circuitry 102 is configured to implement this step.

Next, the computer-implemented method 300 comprises a step of determining S50, by the processing circuitry 102 of the computer system, that the determined speed decrease exceeds a predetermined threshold level. The processing circuitry 102 is configured to implement this step.

Subsequently, the computer-implemented method 300 comprises a step of determining S60, by the processing circuitry 102 of the computer system, that the determined time period of the speed decrease extension is within a predetermined threshold time period. The processing circuitry 102 is configured to implement this step.

Finally, the computer-implemented method 300 comprises a step of determining S70, by the processing circuitry 102 of the computer system, to abort the restart engine attempt. The processing circuitry 102 is configured to implement this step.

Figure 3:
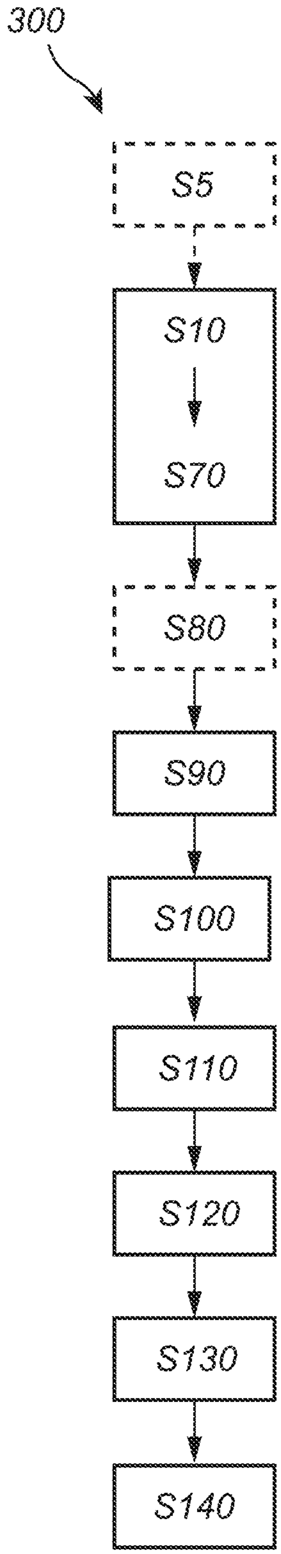
FIG. 3 is a flow chart of an exemplary method to control an engine restart attempt of a vehicle according to an example.

FIG. 3 is a flow chart of an extended example of a method according to an example. More specifically FIG. 3 is an exemplary computer implemented method 300 according to an example. The computer-implemented method 300 in FIG. 3 is also intended for controlling an engine restart attempt of the vehicle 10 in FIG. 1, while the vehicle 10 is moving. The method is generally implemented by the processing circuitry 102.

In this example, the computer-implemented method 300 comprises an initial step of initiating S05, by the processing circuitry 102, the restart engine attempt automatically by receiving a control command from the automatically controlled engine start system 54.

Moreover, the method of FIG. 3 comprises the steps S10 to S70 as mentioned in relation to method of FIG. 2. In other words, the computer-implemented method 300 comprises the step of obtaining S10, by the processing circuitry 102, data comprising real-time rotational speed level of any one of a powertrain shaft being mechanically connected to one or more wheels 21, and the one or more wheels 20, 21, 22.

Further, the computer-implemented method 300 comprises the step of controlling S20, by the processing circuitry 102 of the computer system, a controllable clutch to a torque transfer position, allowing the controllable clutch to change a torque transfer between the engine 12 and the wheels 21. The processing circuitry 102 is configured to implement this step.

Next, the computer-implemented method 300 comprises a step of determining S30, by the processing circuitry 102 of the computer system, from the received data, a speed decrease of the rotational speed level.

Moreover, the computer-implemented method 300 comprises the step of determining S40, by the processing circuitry 102 of the computer system, a time period of the speed decrease extension.

Next, the computer-implemented method 300 comprises the step of determining S50, by the processing circuitry 102 of the computer system, that the determined speed decrease exceeds a predetermined threshold level.

Subsequently, the computer-implemented method 300 comprises the step of determining S60, by the processing circuitry 102 of the computer system, that the determined time period of the speed decrease extension is within a predetermined threshold time period.

Further, the computer-implemented method 300 comprises the step of determining S70, by the processing circuitry 102 of the computer system, to abort the restart engine attempt.

Further, in response to the determined abortion of the clutch controllable restart engine attempt, the computer-implemented method 300 comprises a step of alerting S80 a user of the vehicle about the aborted restart engine attempt. The processing circuitry 102 is configured to implement this step.

Also, in response to the determined abortion of the clutch controllable restart engine attempt, the computer-implemented method 300 comprises a step of performing S90 an additional restart engine attempt.

Next, the computer-implemented method 300 comprises a step of determining S100 to postpone the additional restart engine attempt a predefined time period.

Further, the computer-implemented method 300 comprises a step of decreasing S110, by the processing circuitry 102 of the computer system 100, an engine speed threshold for when fuel is allowed to be injected into the engine 12. This may be performed by decreasing a predetermined required level of engine RPM for starting the engine to a reduced engine RPM. By way of example, the processing circuitry 102 is configured to decrease the engine speed threshold from a predetermined engine speed threshold to a decreased engine speed threshold, such as from 450 RPM to 300 RPM.

Next, after expiration of the predefined time period, the computer-implemented method 300 comprises a step of performing S120, by the processing circuitry 102 of the computer system 100, the additional restart engine attempt by controlling S130 the controllable clutch 14 to restart the engine 12.

Finally, the computer-implemented method 300 comprises a step of controlling S140, by the processing circuitry 102 of the computer system 100, the fuel injector 78 to inject a first fuel portion into the engine 12 at the decreased engine speed threshold.

In above example of FIG. 3, the step of injecting the first fuel portion at the decreased engine speed threshold corresponds to an engine speed that is used at a start with the starter motor 76. By way of example, the engine speed is about 300 rpm.

It should be noted that if the engine restarts by controlling the controllable clutch 14, a confirmation command is fed to the processing circuitry 102. This also means that the engine 12 has been activated. In this manner, the engine restart attempt is determined to be successful. Next, the processing circuitry 102 determines to operate the engine 12 according to any following engine operation, which may include any one of a propulsion engine state, an engine braking state and an idling state.

In one example, when the engine 12 has been started, further fuel is injected into the cylinder(s) so as to maintain the engine 12 in an active state, e.g. an idling state, propulsion state and/or loading state.

In one example, the TCU 50 comprises the processing circuitry 102 configured to perform any one of the exemplary methods 300 described in relation to FIGS. 2 and 3. In this manner, there is provided a closed loop control of the engine restart attempt, in which the TCU 50 may operate and ensure vehicle stability without relying on guaranteed correct "a priori" data of the driving situation, such as vehicle estimated weight, surface friction coefficient, etc. In such example, the TCU 50 can operate and ensure vehicle stability without the vehicle being equipped with EBS 52 including e.g. ABS/ESP functionality. In other examples, the TCU 50 is configured to interact with the EBS 52 such that data from the EBS 52 can be used in the steps of controlling the engine restart attempt according to any one of the examples in FIGS. 2 and 3. By way of example, the EBS 52 can detect excessive brake slip from data from the wheel sensors 42 and transfer such data to the TCU 50 in order to determine the decrease in in rotational speed.

It should be noted that the computer system 100 may be an integral part of the powertrain system 11. In other examples, the computer system 100 and the powertrain system 11 may be separate parts configured to communicate with each other. The computer system 100 may e.g. be a part of a remote server or the like. Hence, in some examples, there is provided a system comprising the powertrain system 11 and the computer system 100, wherein the computer system 100 is configured to be in communication with the powertrain system 11 so as to control an engine restart attempt.

In some examples, there is provided a computer program product comprising program code for performing, when executed by the processing circuitry 102, the method 300 as described above.

In some examples, there is provided a non-transitory computer-readable storage medium comprising instructions, which when executed by the processing circuitry 102, cause the processing circuitry 102 to perform the method 300 as described above.

To sum up, there is provided a computer system 100 for controlling an engine restart attempt of the vehicle 10, while the vehicle 10 is moving, the computer system 100 comprising processing circuitry 102 configured to obtain data comprising real-time rotational speed level of any one of a powertrain shaft being mechanically connected to one or more wheels 21, and the one or more wheels 20, 21, 22*s*; control a controllable clutch to a torque transfer position, allowing the controllable clutch to change a torque transfer between the engine 12 and the wheels 21; determine, from the received data, a speed decrease of the rotational speed level; determine a time period of the speed decrease extension; determine that the determined speed decrease exceeds a predetermined threshold level; determine that the determined time period of the speed decrease extension is within a predetermined threshold time period; and determine to abort the restart engine attempt.

Further details of one example of a computer system that can be used as the computer system 100 will now be described in relation to FIG. 4.

Figure 4:
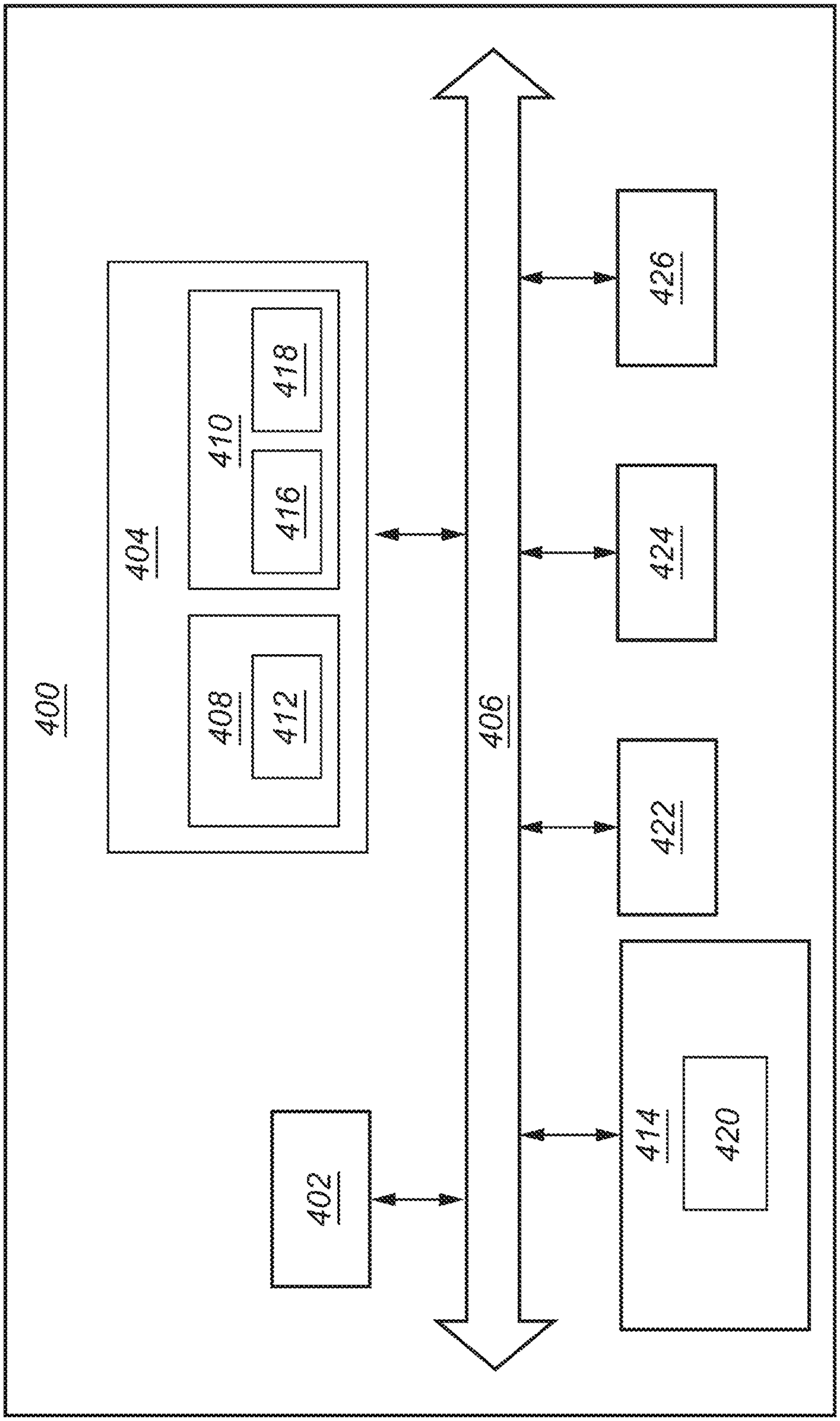
FIG. 4 is a schematic diagram of an exemplary computer system for implementing examples disclosed herein, according to an example.

FIG. 4 is a schematic diagram of a computer system 400 for implementing examples disclosed herein. The computer system 400 is adapted to execute instructions from a computer-readable medium to perform these and/or any of the functions or processing described herein. The computer system 400 may be connected (e.g., networked) to other machines in a LAN (Local Area Network), LIN (Local Interconnect Network), automotive network communication protocol (e.g., FlexRay), an intranet, an extranet, or the Internet. While only a single device is illustrated, the computer system 400 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 400 may comprise at least one computing device or electronic device capable of including firmware, hardware, and/or executing software instructions to implement the functionality described herein. The computer system 400 may include processing circuitry 402 (e.g., processing circuitry including one or more processor devices or control units), a memory 404, and a system bus 406. The computer system 400 may include at least one computing device having the processing circuitry 402. The system bus 406 provides an interface for system components including, but not limited to, the memory 404 and the processing circuitry 402. The processing circuitry 402 may include any number of hardware components for conducting data or signal processing or for executing computer code stored in memory 404. The processing circuitry 402 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 402 may further include computer executable code that controls operation of the programmable device.

The system bus 406 may be any of several types of bus structures that may further interconnect to a memory bus (with or without a memory controller), a peripheral bus, and/or a local bus using any of a variety of bus architectures. The memory 404 may be one or more devices for storing data and/or computer code for completing or facilitating methods described herein. The memory 404 may include database components, object code components, script components, or other types of information structure for supporting the various activities herein. Any distributed or local memory device may be utilized with the systems and methods of this description. The memory 404 may be communicably connected to the processing circuitry 402 (e.g., via a circuit or any other wired, wireless, or network connection) and may include computer code for executing one or more processes described herein. The memory 404 may include non-volatile memory 408 (e.g., read-only memory (ROM), erasable programmable read-only memory (EPROM), electrically erasable programmable read-only memory (EEPROM), etc.), and volatile memory 410 (e.g., random-access memory (RAM)), or any other medium which can be used to carry or store desired program code in the form of machine-executable instructions or data structures and which can be accessed by a computer or other machine with processing circuitry 402. A basic input/output system (BIOS) 412 may be stored in the non-volatile memory 408 and can include the basic routines that help to transfer information between elements within the computer system 400.

The computer system 400 may further include or be coupled to a non-transitory computer-readable storage medium such as the storage device 414, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 414 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 414 and/or in the volatile memory 410, which may include an operating system 416 and/or one or more program modules 418. All or a portion of the examples disclosed herein may be implemented as a computer program 420 stored on a transitory or non-transitory computer-usable or computer-readable storage medium (e.g., single medium or multiple media), such as the storage device 414, which includes complex programming instructions (e.g., complex computer-readable program code) to cause the processing circuitry 402 to carry out actions described herein. Thus, the computer-readable program code of the computer program 420 can comprise software instructions for implementing the functionality of the examples described herein when executed by the processing circuitry 402. In some examples, the storage device 414 may be a computer program product (e.g., readable storage medium) storing the computer program 420 thereon, where at least a portion of a computer program 420 may be loadable (e.g., into a processor) for implementing the functionality of the examples described herein when executed by the processing circuitry 402. The processing circuitry 402 may serve as a controller or control system for the computer system 400 that is to implement the functionality described herein.

The computer system 400 may include an input device interface 422 configured to receive input and selections to be communicated to the computer system 400 when executing instructions, such as from a keyboard, mouse, touch-sensitive surface, etc. Such input devices may be connected to the processing circuitry 402 through the input device interface 422 coupled to the system bus 406 but can be connected through other interfaces, such as a parallel port, an Institute of Electrical and Electronic Engineers (IEEE) 1394 serial port, a Universal Serial Bus (USB) port, an IR interface, and the like. The computer system 400 may include an output device interface 424 configured to forward output, such as to a display, a video display unit (e.g., a liquid crystal display (LCD) or a cathode ray tube (CRT)). The computer system 400 may include a communications interface 426 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Moreover, the present disclosure may be exemplified by any one of the below examples.

Example 1

A computer system 100 for controlling an engine restart attempt of a vehicle 10, while the vehicle is moving, the computer system 100 comprising processing circuitry 102 configured to: obtain data comprising real-time rotational speed level of any one of a powertrain shaft 15, 18, 24 being mechanically connected to one or more wheels 21, and the one or more wheels 20, 21, 22; control a controllable clutch 14 to a torque transfer position, allowing the controllable clutch 14 to change a torque transfer between the engine 12 and the wheels 23, 21, 22; determine, from the received data, a speed decrease of the rotational speed level; determine a time period of the speed decrease extension; determine that the determined speed decrease exceeds a predetermined threshold level; determine that the determined time period of the speed decrease extension is within a predetermined threshold time period; and determine to abort the restart engine attempt.

Example 2

Computer system according to example 1, wherein the powertrain shaft being mechanically connected to one or more wheels is any one of an internal shaft of a transmission arrangement, an output shaft of a transmission arrangement, and a driven axle of the wheel.

Example 3

Computer system according to example 1 or example 2, wherein the real-time rotational speed level of the powertrain shaft is obtained from a sensor configured to measure a speed parameter.

Example 4

Computer system according to any of examples 1 to 3, wherein the real-time rotational speed level of the wheels is obtained from one or more wheel sensors.

Example 5

Computer system according to example 4, wherein the speed decrease is determined by comparing a rotational speed level of a driven wheel with a rotational speed level of a non-driven wheel.

Example 6

Computer system according to any of examples 1 to 5, wherein, in response to the determined abortion of the clutch controllable restart engine attempt, the processing circuitry is configured to alert a user of the vehicle about the aborted restart engine attempt.

Example 7

Computer system according to any of examples 1 to 6, wherein, in response to the determined abortion of the clutch controllable restart engine attempt, the processing circuitry is further configured to perform an additional restart engine attempt.

Example 8

Computer system according to example 7, wherein, the processing circuitry is configured to determine to postpone the additional restart engine attempt a predefined time period; to determine to decrease an engine speed threshold for when fuel is allowed to be injected into the engine; after expiration of the predefined time period, to perform the second restart engine attempt by controlling a controllable clutch to restart the engine, while further allowing a fuel injector to inject a first fuel portion into the engine at the decreased engine speed threshold.

Example 9 wherein the processing circuitry is configured to inject the first fuel portion at a decreased engine speed corresponding to an engine speed that is used at a start with the starter motor 76.

Example 10

Computer system according to example 7, wherein the additional restart engine attempt is performed by the starter motor 76.

Example 11

Computer system according to any of examples 1 to 10, wherein the processing circuitry is configured to initiate the restart engine attempt automatically by receiving a control command from an automatically controlled engine start system 54.

Example 12

A powertrain system comprising the computer system according to any of examples 1 to 11, an internal combustion engine, a controllable clutch, a transmission coupled to the engine by means of the controllable clutch, and wherein the transmission further comprises an output shaft configured to be coupled to a driven axle of a set of wheels.

Example 13

Powertrain system according to example 12, further comprising a starter motor.

Example 14

A vehicle 1 comprising the computer system of any of the examples 1-10 and/or a powertrain system according to any of examples 12-13.

Example 15

Vehicle according to example 14, wherein the vehicle is a non-electric heavy-duty vehicle.

Example 16

A computer-implemented method for controlling an engine restart attempt of a vehicle, while the vehicle is moving, wherein the method comprises: obtaining S10, by a processing circuitry 102 of a computer system, data comprising real-time rotational speed level of any one of a powertrain shaft being mechanically connected to one or more wheels 21, and the one or more wheels 20, 21, 22; controlling S20, by the processing circuitry 102 of the computer system, a controllable clutch to a torque transfer position, allowing the controllable clutch to change a torque transfer between the engine and the wheels; determining S30, by the processing circuitry 102 of the computer system, from the received data, a speed decrease of the rotational speed level; determining S40, by the processing circuitry 102 of the computer system, a time period of the speed decrease extension; determining S50, by the processing circuitry 102 of the computer system, that the determined speed decrease exceeds a predetermined threshold level; determining S60, by the processing circuitry 102 of the computer system, that the determined time period of the speed decrease extension is within a predetermined threshold time period; and determining S70, by the processing circuitry 102 of the computer system, to abort the restart engine attempt.

Example 17

A computer program product comprising program code for performing, when executed by the processing circuitry, the method of example 16.

Example 18

A non-transitory computer-readable storage medium comprising instructions, which when executed by the processing circuitry, cause the processing circuitry to perform the method of example 16.

The term "operatively connected", as used herein, typically means that a first component is in operative relation to another second component. By way of example, the term operatively connected means that the first component is connectable, or connected, to the second component in a manner allowing a transfer of a rotational movement and/or rotational torque from the first component to the second component. Therefore, the term encompasses a functional construction in which two components are connected such that the rotational speed of the first component corresponds to the rotational speed of the second component. However, the term also encompasses a functional construction in which there is a ratio between the rotational movement of the first component and the rotational movement of the second component, i.e., the rotational speed of the second component is proportional to the rotational speed of the first component.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A computer system for controlling an engine restart attempt of a vehicle, while the vehicle is moving downhill, the computer system comprising processing circuitry configured to: obtain data comprising real-time rotational speed level of any one of a powertrain shaft being mechanically connected to one or more wheels, and the one or more wheels; control a controllable clutch to a torque transfer position, allowing the controllable clutch to change a torque transfer between an engine and the one or more wheels; determine, from the received data, a speed decrease of the rotational speed level; determine a time period of the speed decrease extension; determine that the determined speed decrease exceeds a predetermined threshold level; determine that the determined time period of the speed decrease extension is within a predetermined threshold time period; determine to abort the restart engine attempt, wherein the real-time rotational speed level of the one or more wheels is obtained from one or more wheel sensors, and wherein the speed decrease is determined by comparing a rotational speed level of a driven wheel with a rotational speed level of a non-driven wheel.

2. Computer system according to claim 1, wherein the powertrain shaft being mechanically connected to one or more wheels is any one of an internal shaft of a transmission arrangement, an output shaft of a transmission arrangement, and a driven wheel axle.

3. Computer system according to claim 1, wherein the real-time rotational speed level of the powertrain shaft is obtained from a sensor configured to measure a speed parameter.

4. Computer system according to claim 1, wherein, in response to the determined abortion of the clutch controllable restart engine attempt, the processing circuitry is configured to alert a user of the vehicle about the aborted restart engine attempt.

5. Computer system according to claim 1, wherein, in response to the determined abortion of the clutch controllable restart engine attempt, the processing circuitry is further configured to perform an additional restart engine attempt.

6. Computer system according to claim 5, wherein, the processing circuitry is configured to determine to postpone the additional restart engine attempt a predefined time period; to decrease an engine speed threshold for when fuel is allowed to be injected into the engine; after expiration of the predefined time period, perform the additional restart engine attempt by controlling a controllable clutch to restart the engine, while further allowing a fuel injector to inject a first fuel portion into the engine at the decreased engine speed threshold.

7. Computer system according to claim 5, wherein the additional restart engine attempt is performed by a starter motor.

8. Computer system according to claim 1, wherein the processing circuitry is configured to initiate the restart engine attempt automatically by receiving a control command from an automatically controlled engine start system.

9. A powertrain system comprising the computer system according to claim 1, an internal combustion engine, a controllable clutch, a transmission arrangement coupled to the engine by means of the controllable clutch, and wherein the transmission arrangement further comprises an output shaft configured to be coupled to a driven wheel axle.

10. A vehicle comprising the computer system of claim 1 and a powertrain system.

11. A computer-implemented method for controlling an engine restart attempt of a vehicle, while the vehicle is moving downhill, wherein the method comprises:

obtaining, by a processing circuitry of a computer system, data comprising real-time rotational speed level of any one of a powertrain shaft being mechanically connected to one or more wheels, and the one or more wheels; controlling, by the processing circuitry of the computer system, a controllable clutch to a torque transfer position, allowing the controllable clutch to change a torque transfer between the engine and the one or more wheels; determining, by the processing circuitry of the computer system, from the received data, a speed decrease of the rotational speed level; determining, by the processing circuitry of the computer system, a time period of the speed decrease extension; determining, by the processing circuitry of the computer system, that the determined speed decrease exceeds a predetermined threshold level; determining, by the processing circuitry of the computer system, that the determined time period of the speed decrease extension is within a predetermined threshold time period; determining, by the processing circuitry of the computer system, to abort the restart engine attempt, wherein the real-time rotational speed level of the one or more wheels is obtained from one or more wheel sensors, and wherein the speed decrease is determined by comparing a rotational speed level of a driven wheel with a rotational speed level of a non-driven wheel.

12. A computer program product comprising program code for performing, when executed by the processing circuitry, the method of claim 11.

13. A non-transitory computer-readable storage medium comprising instructions, which when executed by the processing circuitry, cause the processing circuitry to perform the method of claim 11.

* * * * *